US008490144B2

(12) United States Patent
Karaoguz et al.

(10) Patent No.: US 8,490,144 B2
(45) Date of Patent: Jul. 16, 2013

(54) MEDIA EXCHANGE NETWORK HAVING MEDIA PROCESSING SYSTEMS AND PERSONAL COMPUTERS WITH COMMON USER INTERFACES

(75) Inventors: Jeyhan Karaoguz, Irvine, CA (US); James D. Bennett, Laguna Beach, CA (US)

(73) Assignee: Broadcom Corporation, Irvine, CA (US)

( * ) Notice: Subject to any disclaimer, the term of this patent is extended or adjusted under 35 U.S.C. 154(b) by 2544 days.

(21) Appl. No.: 10/672,654

(22) Filed: Sep. 26, 2003

(65) Prior Publication Data

US 2004/0117850 A1    Jun. 17, 2004

Related U.S. Application Data

(60) Provisional application No. 60/451,170, filed on Feb. 28, 2003, provisional application No. 60/432,472, filed on Dec. 11, 2002, provisional application No. 60/443,894, filed on Jan. 30, 2003, provisional application No. 60/457,179, filed on Mar. 25, 2003.

(51) Int. Cl.
*H04N 7/16* (2006.01)

(52) U.S. Cl.
USPC ........... 725/134; 725/110; 725/112; 725/114; 725/116; 725/117

(58) Field of Classification Search
USPC .................. 725/98, 109, 141, 147, 153, 110, 725/112, 114, 116, 117, 142, 134; 455/3.3, 455/411; 713/153; 370/352, 259
See application file for complete search history.

(56) References Cited

U.S. PATENT DOCUMENTS

| 6,774,926 | B1* | 8/2004 | Ellis et al. ................. 348/14.01 |
| 7,321,969 | B2* | 1/2008 | Schoen et al. ................. 713/153 |
| 2004/0125789 | A1* | 7/2004 | Parker et al. ................. 370/352 |
| 2004/0132403 | A1* | 7/2004 | Alba ............................ 455/3.03 |
| 2004/0203593 | A1* | 10/2004 | Whelan et al. ................. 455/411 |

* cited by examiner

Primary Examiner — Brian Pendleton
Assistant Examiner — Alan Luong
(74) Attorney, Agent, or Firm — Garlick & Markison

(57) ABSTRACT

A system supporting a common user interface for the consumption of media is disclosed. In an embodiment of the present invention, a set top box and a personal computer may have user interfaces that are substantially the same, providing users of such systems substantially the same look and feel in exchanging and consuming media. The media in such an embodiment may comprise audio, still images, video, real time video, and data. In addition, a media peripheral may also have a user interface supporting the exchange and consumption of media, and the user interface may be substantially the same interface as that of a set top box or a personal computer, having substantially the same look and feel.

37 Claims, 14 Drawing Sheets

Device View

| Device 201 | Media Content Categories 202 | | | | |
|---|---|---|---|---|---|
| DVD/CD player #N | | | | | |
| CD Jukebox player | Album title #1<br># tracks<br>Duration<br>Meta info | Album title #2<br># tracks<br>Duration<br>Meta info | Album title<br># tracks<br>Duration<br>Meta info | ••• | Album title #N<br># tracks<br>Duration<br>Meta info |
| Audio (MP3) player #N | Album title #1<br>All tracks<br>Meta info | Album title #2<br>Tracks #3, #7<br>Meta info | Song title #1<br>Meta info | Audio book title<br>Meta info | Audio Notes |
| Internet Radio Server #N | Station #1<br>Jazz | Station #2<br>Rock | ••• | | |
| Image Camera #N | Image file #1 | Image file #2 | Image file #3 | ••• | |
| Video/Image camcorder #N | Video file #1 | Video file #2 | ••• | | |
| Image Server #N | Image file #1 | Image file #2 | ••• | | |
| Video Server #N | Video file #1 | Video file #2 | ••• | | |
| Laptop/PDA/Desktop #N | Image file #1 | Video file #1 | ••• | Audio file #1 | |
| Media Box | Image file #1 | ••• | Video file #1 | Audio file #1 | • |

Fig. 2A

Media View

| Media Content Category 211 | Media content 212 | | | |
|---|---|---|---|---|
| Album title 213 | Track #1 | Track #2 | ... | Track #N |
| CD 214 | | Track #3 | Track #7 | |
| Image file #N 215 | Image #1 | Image #2 | ... | Image #N |
| Movie #N 216 | Movie meta data | | | |
| Internet Radio Station #N 217 | Song #1 | Song #2 | ... | Song #N |
| Internet Media Channel #N 218 | Clip #1 | Clip #2 | Program #1 | Program #2 | ... |

Fig. 2B

| CHANNEL LINE UP | HOUR, DAY ||||| 
|---|---|---|---|---|---|
| | <<1PM | 2PM | ... | 6PM | 7PM>> |
| FAMILY VACATIONS | | | | | |
| KID's SPORTS | | | | | |
| ... | | | | | |
| VACATION in ALASKA VIDEO *802* | | | Normal Estimated Delivery Time: 2 hrs 13 min Cost: 59c (without Queuing) | Showing All Day (48 Min), Earliest Order Time: 4:00PM MPEG-2 1.5 Mbps | |
| VACATION in ALASKA VIDEO *803* | | | Express Estimated Delivery Time: 18 min Cost: $1.2 (with Queuing) | Showing All Day (48 Min), Earliest Order Time: 4:00PM MPEG-2 4 Mbps | |
| VACATION in ALASKA VIDEO *804* | | | Overnight Delivery: Avail Nxt Morning Cost: 5c (Server Stored) | Showing All Day (48 Min), Earliest Order Time: 4:00PM MPEG-2 19 Mbps | |

*800* → (table)

*801* (brace grouping the three VACATION in ALASKA VIDEO rows)

Fig. 8

MEDIA EXCHANGE NETWORK HAVING MEDIA PROCESSING SYSTEMS AND PERSONAL COMPUTERS WITH COMMON USER INTERFACES

CROSS-REFERENCE TO RELATED APPLICATIONS/INCORPORATION BY REFERENCE

This application makes reference to, claims priority to, and claims the benefit of U.S. Provisional Patent Application 60/451,170, entitled "Media Exchange Network Having Media Processing Systems And Personal Computers With Common User Interfaces", filed Feb. 28, 2003, U.S. Provisional Application Ser. No. 60/432,472, entitled "Personal Inter-Home Media Exchange Network", filed Dec. 11, 2002, and U.S. Provisional Application Ser. No. 60/443,894, entitled "Personal Access And Control Of Media Peripherals On A Media Exchange Network", filed Jan. 30, 2003, the complete subject matter of which are hereby incorporated herein by reference, in their entirety.

In addition, the applicants hereby incorporate the complete subject matter herein by reference, in their entirety, of U.S. Provisional Patent Application Ser. No. 60/457,179, entitled "Server Architecture Supporting A Personal Media Exchange Network", filed Mar. 25, 2003, U.S. patent application Ser. No. 10/657,390, entitled "Personal Inter-Home Media Exchange Network", filed Sep. 8, 2003, and U.S. patent application Ser. No. 10/660,267, entitled "Personal Access And Control Of Media Peripherals On A Media Exchange Network", filed Sep. 11, 2003.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

A PC (personal computer) is used to access various types of files and to run various types of functional applications stored within the PC. A PC employing a web browser is often used to access media, data, and services distributed over various web sites on the Internet. A user interacts with the PC by viewing a typical PC interface on the monitor of the PC. Such a PC interface typically comprises various windows and drop down menus that may be manipulated via a mouse or keyboard.

Also, a PC is often used to access media stored on a media peripheral via a wired link. For example, in the case of using a digital camera, a user may place the camera in a download mode, run a PC application that copies the image files from the digital camera to the PC via a cable, and exit the PC application. Such a process may require the user to be fairly PC savvy.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Aspects of the present invention may be observed in a system supporting the exchange and consumption of media using a common user interface. An embodiment of such a system may comprise a television display in a first home, and a first storage for storing media, in the first home. The first storage may have a first associated network address, and the first storage may be communicatively coupled to the television display. The system may comprise a first user interface for display on the television display. The first user interface may support the exchange and consumption of media, and may have a first look and feel. In addition, an embodiment of the present invention may comprise a personal computer monitor in a second home, and a second storage for storing media, in the second home. The second storage may have a second associated network address, and the second storage may be communicatively coupled to the personal computer monitor. An embodiment of the present invention may also comprise a second user interface for display on the personal computer monitor. The second user interface may support the exchange and consumption of media, and may have a second look and feel.

An embodiment of the present invention may comprise server software that receives a request that identifies one of the first and second associated network addresses, and responds by identifying the other of the first and second associated network addresses. Such an embodiment may support the exchange via a communication network of media between one of the first and second storage and the other of the first and second storage for consumption. The first user interface and the second user interface may be substantially the same user interface, and the first look and feel and the second look and feel may be substantially the same.

In an embodiment of the present invention, the media may comprise at least one of audio, a still image, video, and data, and the media may comprise real-time video. Consumption may comprise at least one of playing audio, displaying a still image, displaying video, and displaying data. The first and second associated network addresses may be one of an Internet protocol (IP) address, a media access control (MAC) address, and an electronic serial number (ESN). The communication network in an embodiment of the present invention may comprise at least one of a cable infrastructure, a satellite network infrastructure, a digital subscriber line (DSL) infrastructure, an Internet infrastructure, an intranet infrastructure, a wired infrastructure, and a wireless infrastructure. The communication network may be the Internet.

In an embodiment in accordance with the present invention, the first and second user interfaces may comprise a view having at least one media channel, and the media channel may comprise media available for consumption. At least a portion of the media available for consumption may be user captured media. The first and second user interfaces may comprise a view displaying information related to at least one media peripheral. The at least one media peripheral may comprise at least one of a digital camera, a digital camcorder, an MP3 player, a home juke-box system, a multi-media personal digital assistant (PDA), and a mobile multi-media gateway device.

An embodiment of the present invention may comprise at least one media peripheral communicatively coupled to one of the first storage and the second storage. Such an embodiment may comprise a third user interface for display on the at least one media peripheral. The third user interface may support the exchange and consumption of media, and may have a third look and feel. In addition, the first, second, and third user interfaces may be substantially the same user interface, and the first look and feel, the second look and feel, and the third look and feel may be substantially the same. The at least one media peripheral may comprise at least one of a digital camera, a digital camcorder, an MP3 player, a home juke-box system, a multi-media personal digital assistant (PDA), a mobile multi-media gateway device, and a personal computer (PC).

Additional aspects of the present invention may be found in a system supporting the exchange and consumption of media using a common user interface. Such a system may comprise a television display in a first home, and set top box circuitry, in the first home, communicatively coupled to the television display. An embodiment of the present invention may comprise a first user interface for display on the television display, and the first user interface may have a first look and feel. In addition, an embodiment of the present invention may comprise a personal computer in a second home, and a second user interface for display on the personal computer. The second user interface may have a second look and feel. Such an embodiment may comprise server software that participates in the exchange of the media, via a communication network, with at least one of the set top box circuitry and the personal computer to support the consumption of the media. The first user interface and the second user interface in such an embodiment may be substantially the same user interface, and the first look and feel and the second look and feel may be substantially the same.

In an embodiment of the present invention, the media may comprise at least one of audio, a still image, video, and data, and the media may comprise real-time video. Consumption may comprise at least one of playing audio, displaying a still image, displaying video, and displaying data. The communication network in an embodiment of the present invention may comprise at least one of a cable infrastructure, a satellite network infrastructure, a digital subscriber line (DSL) infrastructure, an Internet infrastructure, an intranet infrastructure, a wired infrastructure, and a wireless infrastructure, and the communication network may be the Internet.

In an embodiment of the present invention, the first and second user interfaces may comprise a view having at least one media channel, and the media channel may comprise media available for consumption. The at least a portion of the media available for consumption may be user captured media. The first and second user interfaces may comprise a view displaying information related to at least one media peripheral. In addition, an embodiment may comprise at least one media peripheral communicatively coupled to one of the set top box circuitry and the personal computer, and a third user interface for display on the at least one media peripheral. The third user interface may support the exchange and consumption of media, and may have a third look and feel. The first, second, and third user interfaces may be substantially the same user interface, and the first look and feel, the second look and feel, and the third look and feel may be substantially the same. The at least one media peripheral may comprise at least one of a digital camera, a digital camcorder, an MP3 player, a home juke-box system, a multi-media personal digital assistant (PDA), a mobile multi-media gateway device, and a personal computer (PC).

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 2A is a diagram illustrating an embodiment of a device view common user interface comprising a table of media storage devices versus stored media content categories within the media exchange network of FIG. 1, in accordance with various aspects of the present invention.

FIG. 2B is a diagram illustrating an embodiment of a media view common user interface comprising a table of the media content categories of FIG. 2A versus specific media content within the media exchange network of FIG. 1, in accordance with various aspects of the present invention.

FIG. 8 is an exemplary illustration of a TV guide channel user interface showing several options of a pushed media in accordance with an embodiment of the present invention.

DETAILED DESCRIPTION OF THE INVENTION

Certain embodiments of the present invention relate to providing a user interface for exchanging media. In particular, certain embodiments of the present invention relate to providing several common user interfaces on PC's and MPS's (media processing systems) on a media exchange network.

Figure 1:
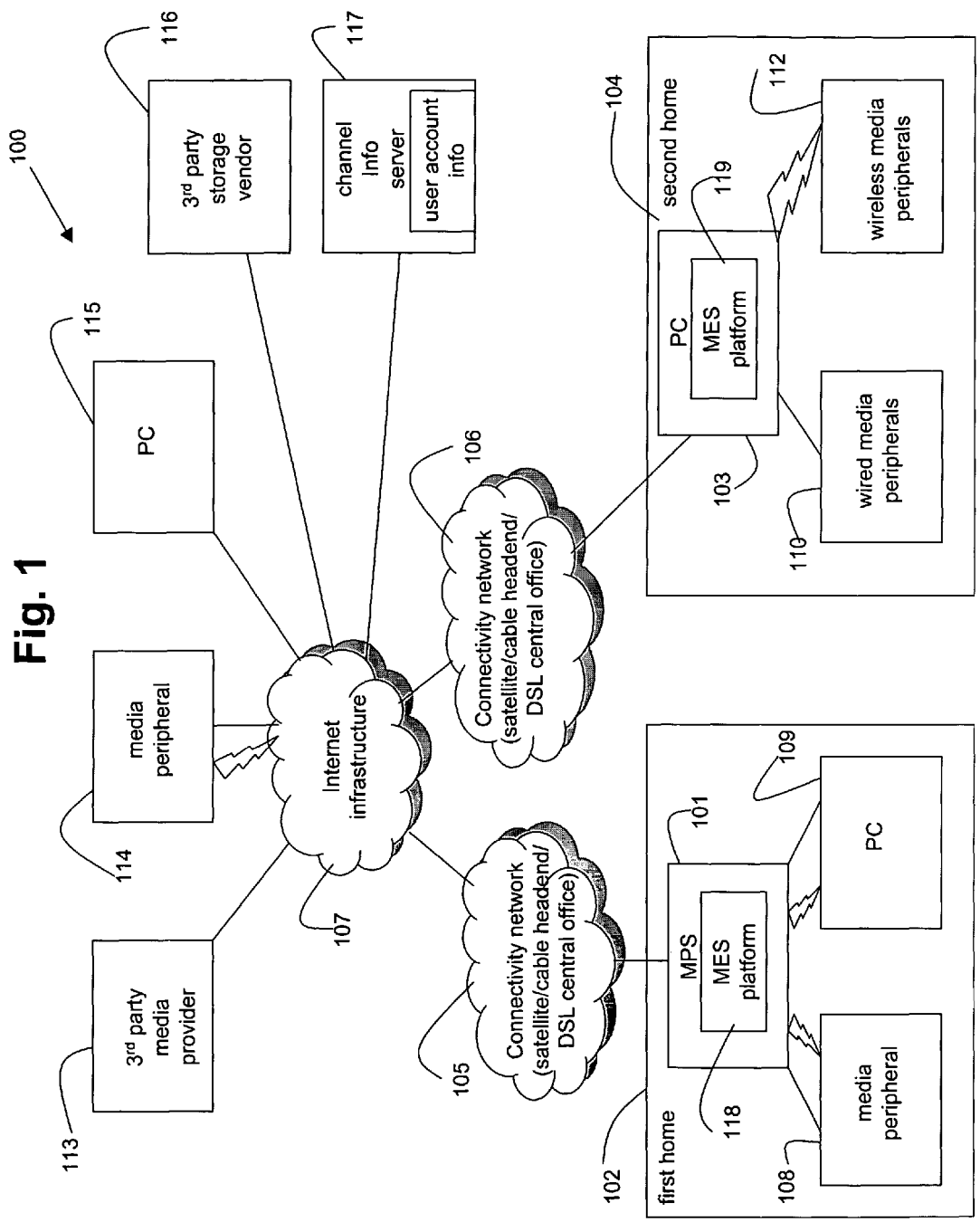
FIG. 1 is a diagram illustrating an embodiment of a media exchange network supporting common user interfaces, in accordance with various aspects of the present invention.

FIG. 1 is a diagram illustrating an embodiment of a media exchange network 100 supporting common user interfaces, in accordance with various aspects of the present invention. Specifically, a media exchange network 100 is a communication network comprising at least one MPS (media processing system) 101 located in a first home 102 of the media exchange network 100, a PC 103 located at a second home 104, a first connectivity network 105, a second connectivity network 106, and the Internet infrastructure 107. The MPS 101 interfaces to the first connectivity network 105, and the PC 103 interfaces to the second connectivity network 106. Both connectivity networks 105 and 106 interface to the Internet infrastructure 107.

The media exchange network 100 also comprises a media peripheral 108 and a PC 109 both interfacing, via a wired or wireless connection, to the MPS 101. The media exchange network 100 further comprises wired media peripherals 110 interfacing to the PC 103 via wired connections, and wireless media peripherals 112 interfacing to the PC 103 via wireless connections.

The media exchange network 100 also comprises several other systems interfacing to the Internet infrastructure 107 including a $3^{rd}$ party media provider 113, a media peripheral 114, a PC 115, a $3^{rd}$ party storage vendor 116, and a channel info server 117.

The various elements of the media exchange network 100 include storage locations for digital media and data. The storage locations may comprise, for example, hard disk drives, a DVD player, a CD player, floppy disk drives, RAM, or any combination of these. The storage locations may also include, for example, memory sticks, PCM/CIA cards, compact flash cards, or any combination of these.

The PC's may comprise desktop PC's, notebook PC's, PDA's, or any computing device.

The various media peripherals (108, 110, 112, 114) of the media exchange network 100 may include, for example, a digital camera, a digital camcorder, a MP3 player, a home juke-box system, a PDA (personal digital assistant), and a multi-media gateway device. The MPS 101 may include a TV screen for viewing and interacting with various common user interfaces that are available on the media exchange network. The PC 103 may include a PC monitor for viewing and interacting with various common user interfaces that are available on the media exchange network.

The connectivity networks 105 and 106 may comprise, for example, a satellite network, a cable head end, or a digital subscriber line (DSL) equipped central office. Various embodiments of the present invention may also be supported using an intranet infrastructure, a wired infrastructure, and/or a wireless infrastructure. Entities throughout the media exchange network 100 including, for example, those connected through Internet infrastructure 107, and connectivity networks 105, 106 may be identified using network addresses. Examples of suitable network addresses include, for example, Internet protocol (IP) addresses, media access control (MAC) addresses, and electronic serial numbers (ESN's).

In accordance with various embodiments of the present invention, a MPS may comprise a set-top-box (STB), a PC, or a TV with a media management system (MMS). A MMS is also known herein as a media exchange software (MES) platform.

A MMS comprises a software platform operating on at least one processor to provide certain functionality including user interface functionality, distributed storage functionality, and networking functionality. For example, a MMS may provide control of media peripheral devices, status monitoring of media peripheral devices, and inter-home MPS routing selection, in accordance with an embodiment of the present invention.

The MPS 101 and the PC 103 each comprise a MES (media exchange software) platform 118 and 119, respectively. The MES platforms 118 and 119 provide the capability to detect the various devices that are connected to the media exchange network 100, identify the media content stored in those devices, and associate the media content with the devices and media content categories. The MES platforms 118 and 119 also provide the common user interfaces and associated functionality on the media exchange network 100. In accordance with an embodiment of the present invention, a set of common user interfaces are provided on the media exchange network 100 that may be used on both MPS's and PC's of the media exchange network 100.

In accordance with an embodiment of the present invention, the MPS 101 includes a TV screen and a remote control for the display and control of the common user interfaces. The PC 103 comprises a monitor, keyboard, and mouse for the display and control of the common user interfaces.

FIG. 2A is a diagram illustrating an embodiment of a device view common user interface 200 comprising a table of media storage devices 201 versus stored media content categories 202 within the media exchange network 100 of FIG. 1, in accordance with various aspects of the present invention. The device view common user interface 200 may be constructed and displayed by MPS 101 and/or PC 103 using the MES platforms 118 and 119, respectively. For example, the device view common user interface 200 may be displayed on a TV screen of the MPS 101 and controlled by a remote control. Also, the device view common user interface 200 may be displayed on a PC monitor of the PC 103 and controlled by a keyboard or mouse.

As an example, the MES platform 118 of the MPS 101 may provide a device view common user interface 200 comprising a table including the following devices:

Media peripheral 108 comprising a DVD/CD player #N;
One of the wired media peripherals 110 comprising a CD Jukebox player;
One of the wireless media peripherals 112 comprising an audio (MP3) player #N;
Channel info server 117 comprising an Internet radio server #N;
Media peripheral 114 comprising an image camera #N;
One of the wireless media peripherals 112 comprising a video/image camcorder #N;
$3^{rd}$ party media provider 113 comprising an image server #N;
$3^{rd}$ party storage vendor 116 comprising a video server #N;
One of the wired media peripherals 110 comprising a laptop/PDA/desktop #N;
PC 103 comprising a media box.

The device view common user interface 200 of MPS 101 may also comprise the following media content categories associated with the devices:

DVD/CD player #N is associated with media content categories comprising an album title having #tracks, duration of tracks, and meta info;
CD Jukebox player is associated with media content categories comprising Album title #1 to Album title #N;
Audio (MP3) player #N is associated with media content categories comprising Album title #1, Album title #2, Song title #1, audio book title, and audio notes;
Internet Radio Server #N is associated with media content categories comprising Station #1 (jazz), Station #2 (Rock), etc.;
Image Camera #N is associated with media content categories comprising Image file #1, Image file #2, Image file #3, etc.;
Video/Image camcorder #N is associated with media content categories comprising Video file #1, Video file #2, etc.;

Image Server #N is associated with media content categories comprising Image file #1, Image file #2, etc.;

Video server #N is associated with media content categories comprising Video file #1, Video file #2, etc.;

Laptop/PDA/Desktop #N is associated with media content categories comprising Image file #1, Video file #1, etc., Audio file #1;

Media box is associated with media content categories comprising Image file #1, etc., Video file #1, etc., Audio file #1, etc.

The MPS 101 may display the device view 200 to a user of MPS 101 as a common user interface of the media exchange network 100.

FIG. 2B is a diagram illustrating an embodiment of a media view common user interface 210 comprising a table of the media content categories 211 of FIG. 2A versus specific media content 212 within the media exchange network 100 of FIG. 1, in accordance with various aspects of the present invention. The media view common user interface 210 may be constructed and displayed by MPS 101 and/or PC 103 using the MES platforms 118 and 119, respectively. For example, the media view common user interface 210 may be displayed on a TV screen of the MPS 101 and controlled by a remote control. Also, the media view common user interface 210 may be displayed on a PC monitor of the PC 103 and controlled by a keyboard or mouse.

As an example, the MES platform 119 of the PC 103 may provide a media view common user interface 210 comprising the following media content categories 211:

album title 213 stored on media peripheral 114;
CD 214 stored on $3^{rd}$ party storage vendor 116;
Image file #N 215 stored on media peripheral 108;
Movie #N 216 stored on $3^{rd}$ party media provider 113;
Internet radio station #N 217 stored on $3^{rd}$ party media provider 113;
Internet media channel #N 218 stored on channel info server 117.

The media view common user interface 210 on PC 103 may also comprise the specific media content 212 associated with the media content categories as:

Album title 213 is associated with media content comprising Tracks #1 to #N;
CD 214 is associated with media content comprising Track #3 and Track #7;
Image file #N 215 is associated with media content comprising Images #1 to #N;
Movie #N 216 is associated with media content comprising movie meta data;
Internet radio station #N 217 is associated with media content comprising Songs #1 to #N.
Internet media channel #N 218 is associated with media content comprising Clip #1 to #2, and program #1 to #2.

The PC 103 may display the media view 210 to a user of the PC 103 as a common user interface on the media exchange network 100.

Figure 2C:
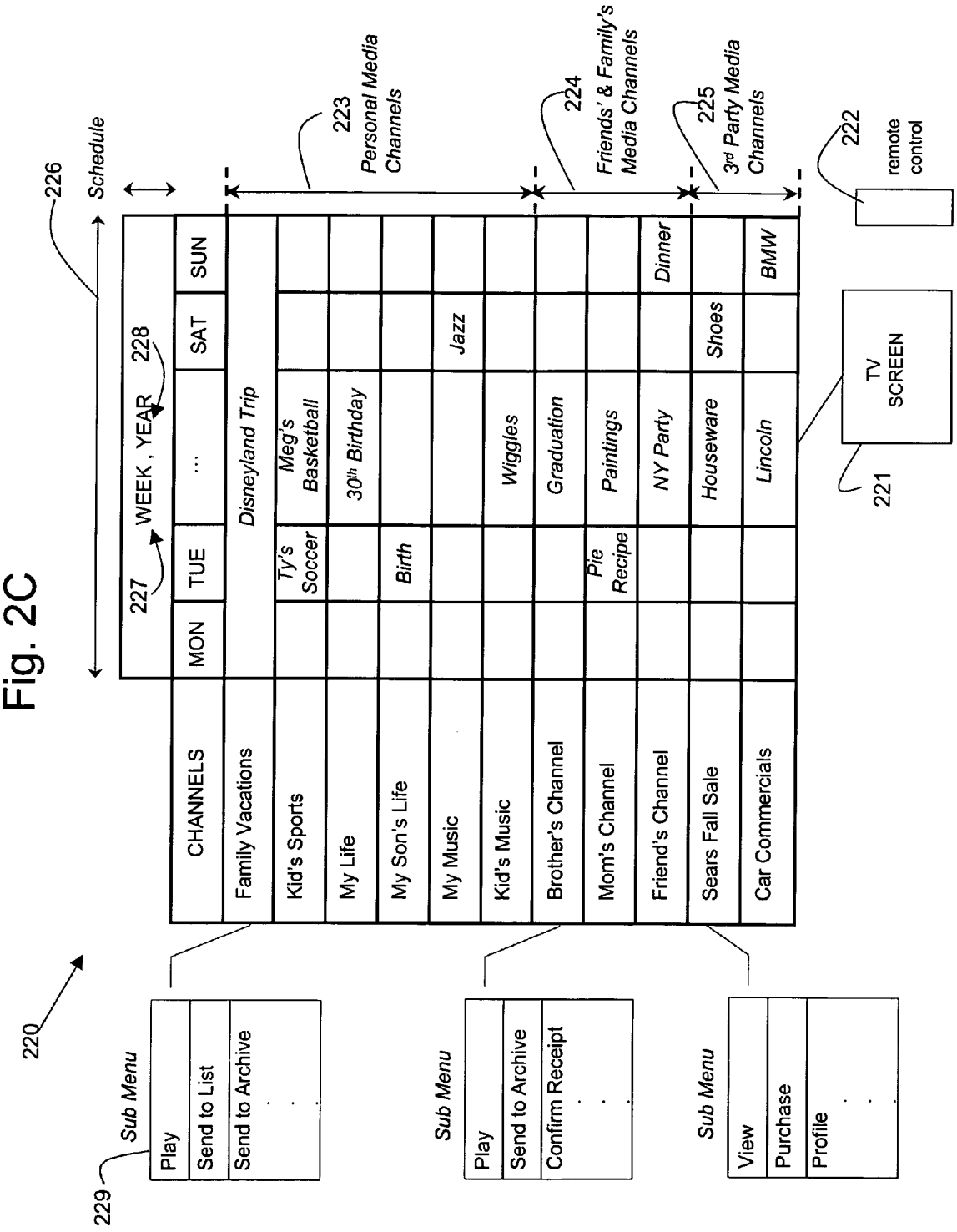
FIG. 2C illustrates an embodiment of a channel view common user interface having a TV guide look-and-feel within the media exchange network of FIG. 1, in accordance with various aspects of the present invention.

FIG. 2C illustrates an embodiment of a channel view common user interface 220 having a TV guide look-and-feel within the media exchange network 100 of FIG. 1, in accordance with various aspects of the present invention. The channel view common user interface 220 may be constructed and displayed by MPS 101 and/or PC 103 using the MES platforms 118 and 119, respectively. The channel view common user interface 220 may be displayed on a TV screen 221 and controlled by a remote control device 222. Also, the channel view common user interface 220 may be displayed on a PC monitor and controlled by a keyboard or mouse.

The channel view common user interface 220 may be configured not only for conventional TV channels but also for personal media channels 223 that are constructed by a user of a media exchange network, friend's and family's media channels 224 constructed by friends and family, and third party channels 225 that are constructed by third parties either upon request by a user of a media exchange network or based on a profile of a user.

The personal media channels 223 may include, for example, a "family vacations channel", a "kid's sports channel", a "my life channel", a "son's life channel", a "my music channel", and a "kid's music channel". The friends and family media channels 224 may include, for example, a "brother's channel", a "Mom's channel", and a "friend's channel". The third party media channels 225 may include, for example, a "Sears Fall sale channel" and a "car commercials channel".

Each media channel may correspond to a schedule 226 showing, for example, a week 227 and a year 228. For example, under the "kid's sports channel", Ty's soccer game could be scheduled to be viewed on Tuesday of the current week 227 and current year 228. For each media channel, a sub-menu 229 allows for selection of certain control and access functions such as "play", "send to list", "send to archive", "confirm receipt", "view", "purchase", and "profile".

Other MPS's and PC's may be connected to the media exchange network 100, in accordance with various alternative embodiments of the present invention, and each provide the same type of common user interfaces and associated functionality.

In accordance with an alternative embodiment of the present invention, conventional PC user interfaces, such as windows and drop down-menus, may be provided by the MES platforms and be displayed by both MPS's and PC's on the media exchange network 100. Such PC interfaces may be preferred by PC savvy users of the media exchange network 100.

A major challenge is to be able to transfer and share many different types of digital media, data, and services between one device/location and another with ease while being able to index, manage, and store the digital media and data.

For example, it is desirable to be able to distribute and store many types of digital media in a PC and/or television environment in a user-friendly manner without requiring many different types of software applications and/or unique and dedicated interfaces. Any networking issues or other technical issues should be transparent to the users. It is also desirable to take advantage of existing hardware infrastructure, as much as possible, when providing such capability.

In an embodiment of the present invention, a media exchange network is provided that enables many types of digital media, data, and/or services to be stored, indexed, viewed, searched for, pushed from one user to another, and requested by users, using a TV channel guide look-and-feel user interface. The media exchange network also allows a user to construct personal media channels that comprise his personal digital media (e.g., captured digital pictures, digital video, digital audio, etc.), request that third-party media channels be constructed from third-party digital media, and access the media channels pushed to him by other users on the media exchange network.

PC's may be used but are not required to interface to the media exchange network for the purpose of exchanging digital media, data, and services. Instead, set-top-boxes or integrated MPS's (media processing systems) may be used with the media exchange network to perform all of the previously described media exchange functions using a remote control with a television screen.

Current set-top-boxes may be software enhanced to create a MPS that provides full media exchange network interfacing and functionality via a TV screen with a TV guide look-and-feel. PC's may be software enhanced as well and provide the same TV guide look-and-feel. Therefore, the media exchange network supports both PC's and MPS's in a similar manner. Alternatively, a fully integrated MPS may be designed from the ground up, having full MPS capability.

In the case of an MPS configuration, the user takes advantage of his remote control and TV screen to use the media exchange network. In the case of a PC configuration, the user takes advantage of his keyboard and/or mouse to use the media exchange network.

An MPS or enhanced PC is effectively a storage and distribution platform for the exchange of personal and third party digital media, data, and services as well as for bringing the conventional television channels to a user's home. An MPS and/or PC connects to the media exchange network via an existing communication infrastructure which may include cable, DSL, satellite, etc. The connection to the communication infrastructure may be hard-wired or wireless.

The media exchange network allows users to effectively become their own broadcasters from their own homes by creating their own media channels and pushing those media channels to other authorized users on the media exchange network, such as friends and family members.

Figure 3:
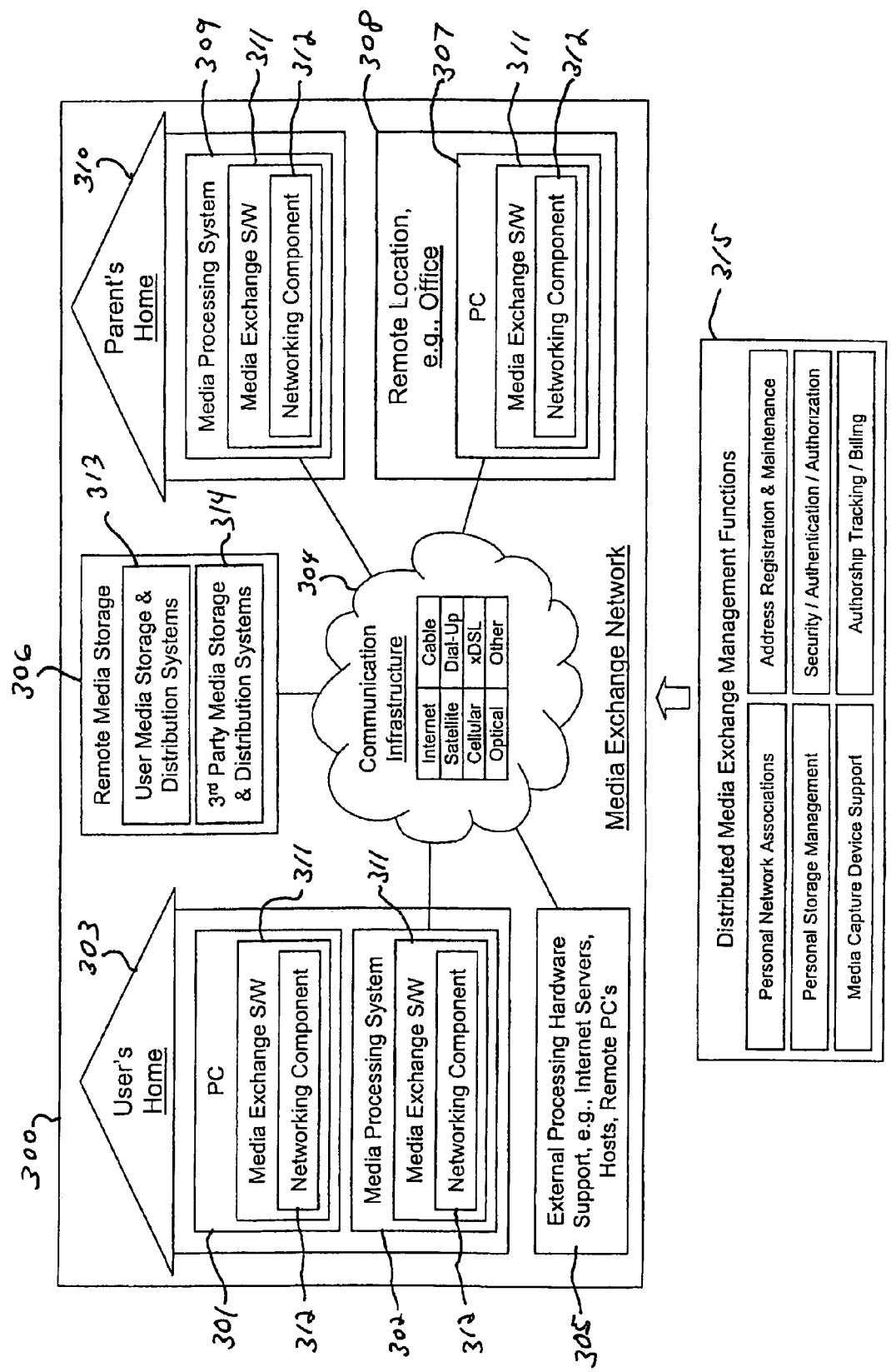
FIG. 3 is a schematic block diagram of a first exemplary media exchange network in accordance with an embodiment of the present invention.

FIG. 3 comprises a media exchange network 300 for exchanging and sharing digital media, data, and services in accordance with an embodiment of the present invention. The media exchange network 300 is a secure, closed network environment that is only accessible to pre-defined users and service providers. The media exchange network of FIG. 3 comprises a first PC 301 and a first media processing system (MPS) 302 at a user's home 303, a communication infrastructure 304, external processing hardware support 305, remote media storage 306, a second PC 307 at a remote location 308 such as an office, and a second MPS 309 at a parent's home 310.

The PC's 301 and 307 and the MPS's 302 and 309 each include a media exchange software (MES) platform 311 and a networking component 312 for connectivity. The MES platform 311 provides multiple capabilities including media "push" capability, media "access" capability, media channel construction/selection, image sequence selection, text and voice overlay, channel and program naming, inter-home routing selection, authorship and media rights management, shared inter-home media experience, billing service, and an integrated TV channel guide look-and-feel.

The external processing hardware support 305 comprises at least one server such as a centralized internet server, a peer-to-peer server, or cable head end. The server may alternatively be distributed over various hosts or remote PC's. The MES platform 311 may also reside on the external processing hardware support server 305. The remote media storage 306 may comprise user media storage and distribution systems 313 and/or third party media storage and distribution systems 314.

The communication infrastructure 304 may comprise at least one of internet infrastructure, satellite infrastructure, cable infrastructure, dial-up infrastructure, cellular infrastructure, xDSL infrastructure, optical infrastructure, or some other infrastructure. The communication infrastructure 304 links the user's home 303, parent's home 310, remote media storage 306, and remote location office 308 to each other (i.e., the communication infrastructure 304 links all users and service providers of the media exchange network 300).

The various functions 315 of the media exchange network 300 comprise generating personal network associations, personal storage management, media capture device support, security/authentication/authorization support, authorship tracking and billing and address registration and maintenance. These media exchange management functions 315 may be distributed over various parts of the media exchange network 300. For example, the personal network associations and personal storage management functions may be integrated in the PC 301 at the user's home 303.

Figure 4:
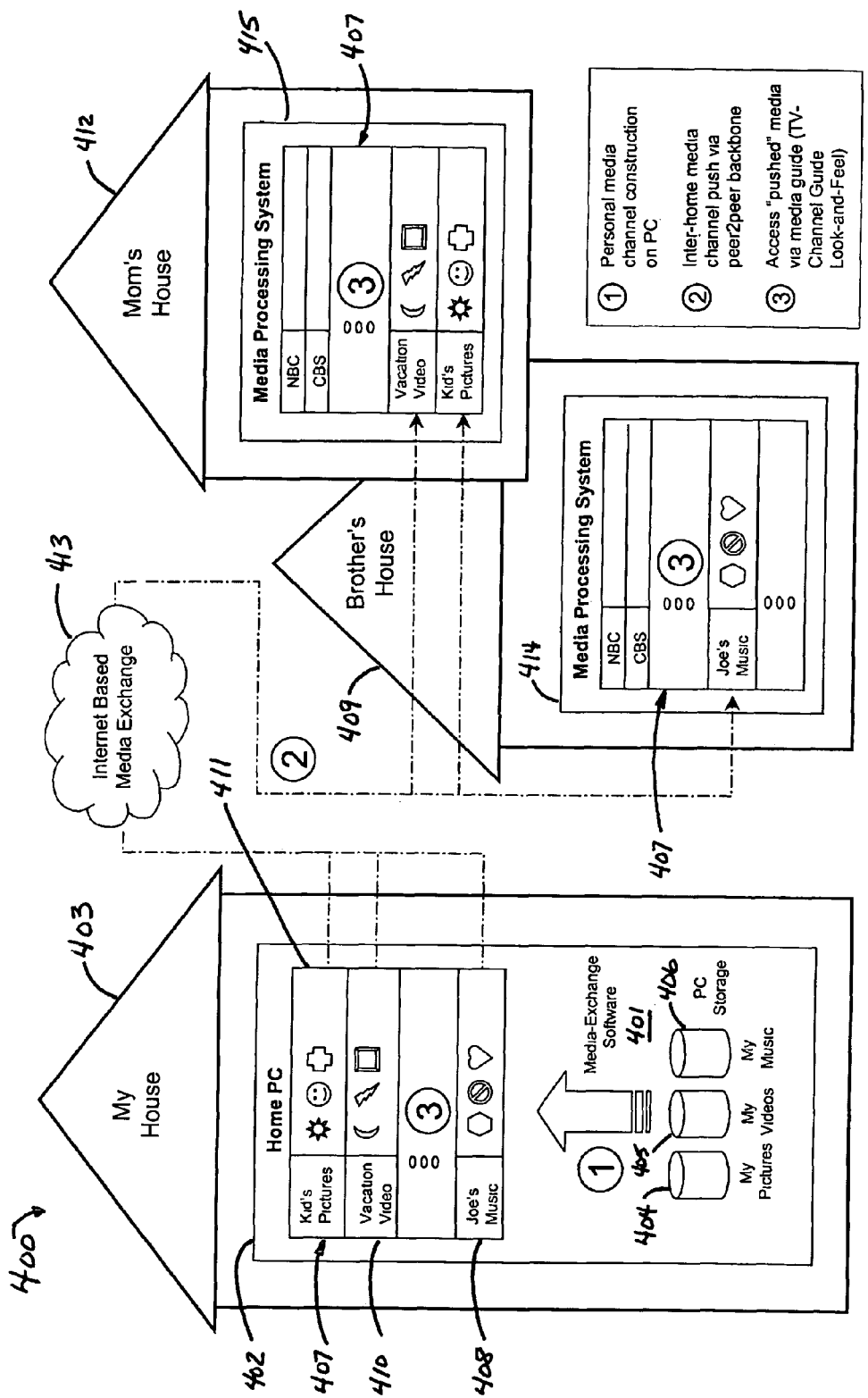
FIG. 4 is a schematic block diagram of performing personal media exchange over a second exemplary media exchange network in accordance with an embodiment of the present invention.

FIG. 4 illustrates an example of personal media exchange over a media exchange network 400 in accordance with an embodiment of the present invention. In step 1, the media exchange software (MES) platform 401 is used to construct personal media channels on a PC 402 by a user at "my house" 403. For example, with various media stored on the PC 402 such as digital pictures 404, videos 405, and music 406, the MES platform 401 allows the digital media to be organized by a user into several channels having a TV channel guide look-and-feel user interface 407 on the PC 402.

In step 2, the user at "my house" 403 pushes a media channel 408 (e.g., "Joe's Music") to "brother's house" 409 and pushes two media channels 410 and 411 (e.g., "Vacation Video" and "Kid's Pictures") to "Mom's house" 412 via a peer-to-peer server 413 over the internet-based media exchange network 400. "Brother's house" 409 includes a first MPS 414 connected to the media exchange network 400. "Mom's house" 412 includes a second MPS 415 connected to the media exchange network 400. The MPS's 414 and 415 also provide a TV channel guide look-and-feel user interface 407.

In step 3, brother and/or Mom access the pushed media channels via their respective media processing systems (MPS's) 414 and 415 using their respective MPS TV screens and remote controls.

Figure 5:
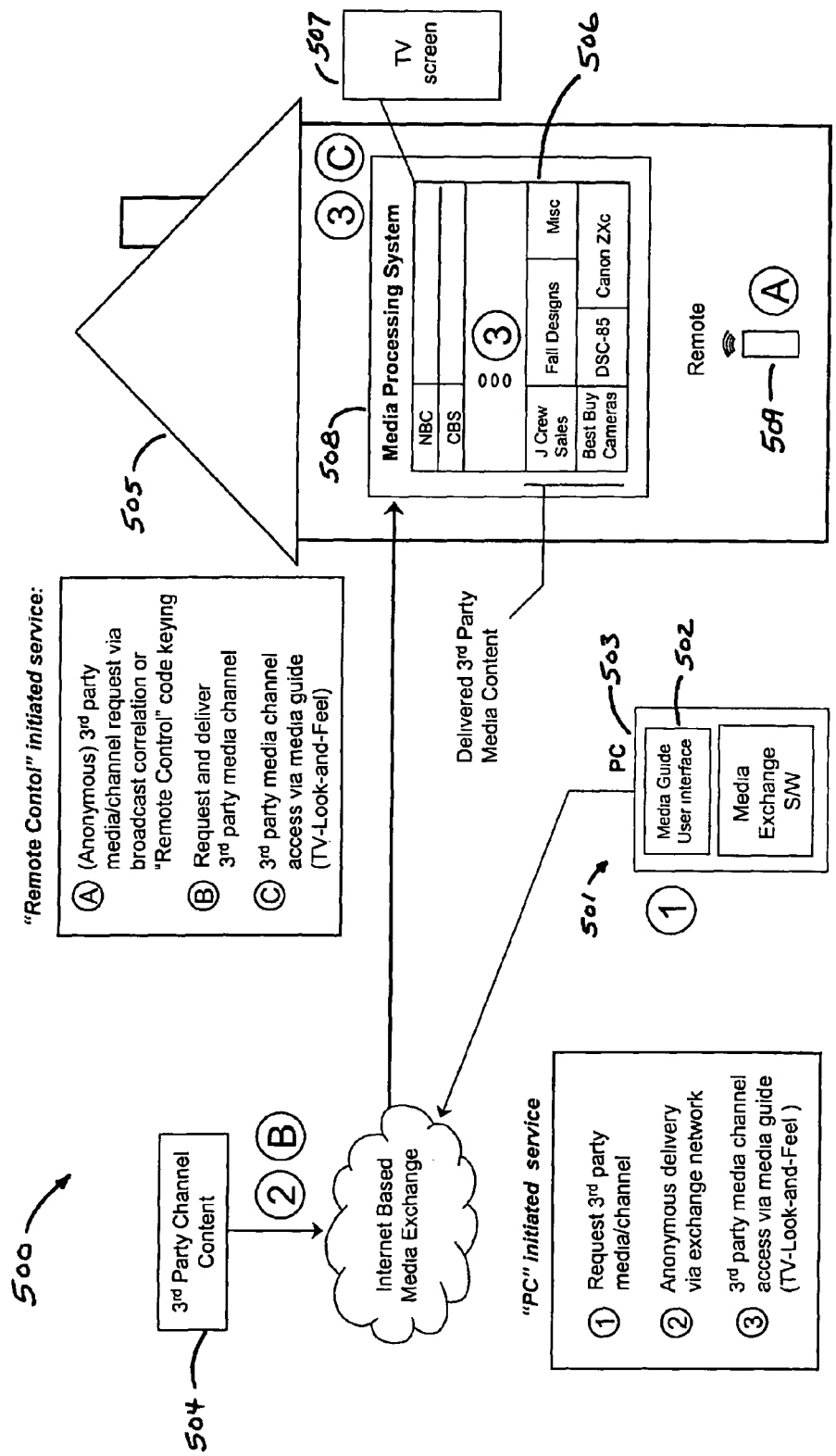
FIG. 5 is a schematic block diagram of performing third-party media exchange over a third exemplary media exchange network in accordance with an embodiment of the present invention.

FIG. 5 illustrates an example of third-party media exchange over a media exchange network 500 in accordance with an embodiment of the present invention. In step 1, a PC-initiated third-party request is made by a first party 501 via an internet-based media exchange network 500 using a TV channel guide look-and-feel user interface 502 on a PC 503. In step 2, an anonymous delivery of the requested third-party channel 504 is made to a second party 505 via the internet-based media exchange network 500. In step 3, the second party 505 accesses the third-party channel 504 using a TV channel guide look-and-feel user interface 506 on a TV screen 507 that is integrated into an MPS 508.

Similarly, in step A, an MPS-initiated third-party request is made by a second party 505 via an internet-based media exchange network 500 using a TV channel guide look-and-feel user interface 506 on a TV screen 507 using a remote control 509. The second party 505 may key in a code, using his remote control 509, that is correlated to a commercial or some other third party broadcast media. In step B, an anonymous delivery of the requested third-party channel 504 is made to a first party 501 via the internet-based media exchange network 500. In step C, the first party 501 accesses the third-party channel 504 using a TV channel guide look-and-feel user interface 502 on a PC 503.

Figure 6:
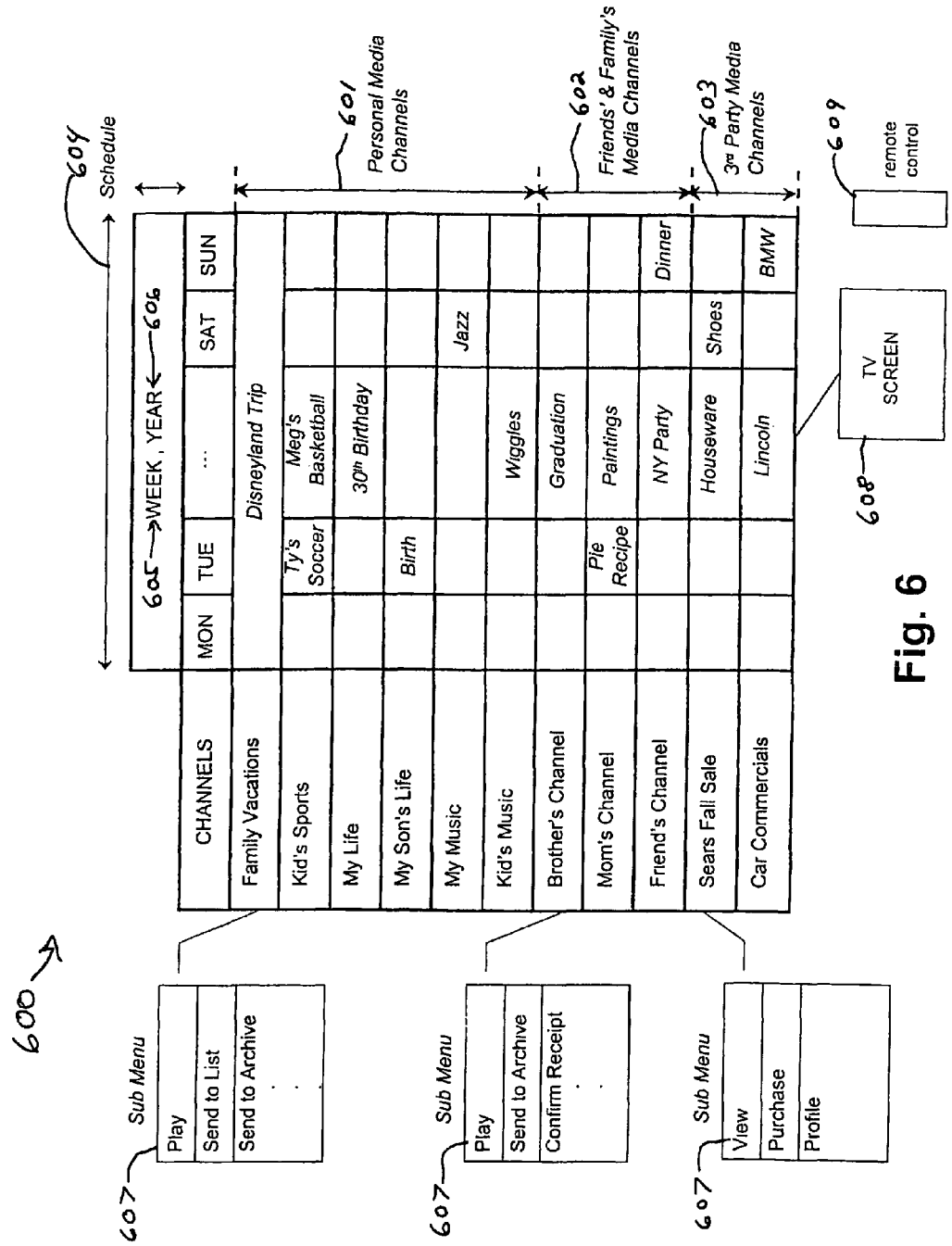
FIG. 6 is an exemplary illustration of a TV guide channel user interface in accordance with an embodiment of the present invention.

FIG. 6 illustrates a TV channel guide user interface 600 in accordance with an embodiment of the present invention. The TV channel guide user interface 600 may be displayed on a TV screen 608 and controlled by a remote control device 609.

Also, the TV channel guide user interface 600 may be displayed on a PC monitor and controlled by a keyboard or mouse.

The TV channel guide user interface 600 may be configured not only for conventional TV channels but also for personal media channels 601 that are constructed by a user of a media exchange network, friend's and family's media channels 602 constructed by friends and family, and third party channels 603 that are constructed by third parties either upon request by a user of a media exchange network or based on a profile of a user.

The personal media channels 601 may include, for example, a "family vacations channel", a "kid's sports channel", a "my life channel", a "son's life channel", a "my music channel", and a "kid's music channel". The friends and family media channels 602 may include, for example, a "brother's channel", a "Mom's channel", and a "friend's channel". The third party media channels 603 may include, for example, a "Sears Fall sale channel" and a "car commercials channel".

Each media channel may correspond to a schedule 604 showing, for example, a week 605 and a year 606. For example, under the "kid's sports channel", Ty's soccer game could be scheduled to be viewed on Tuesday of the current week 605 and current year 606. For each media channel, a sub-menu 607 allows for selection of certain control and access functions such as "play", "send to list", "send to archive", "confirm receipt", "view", "purchase", and "profile".

Figure 7:
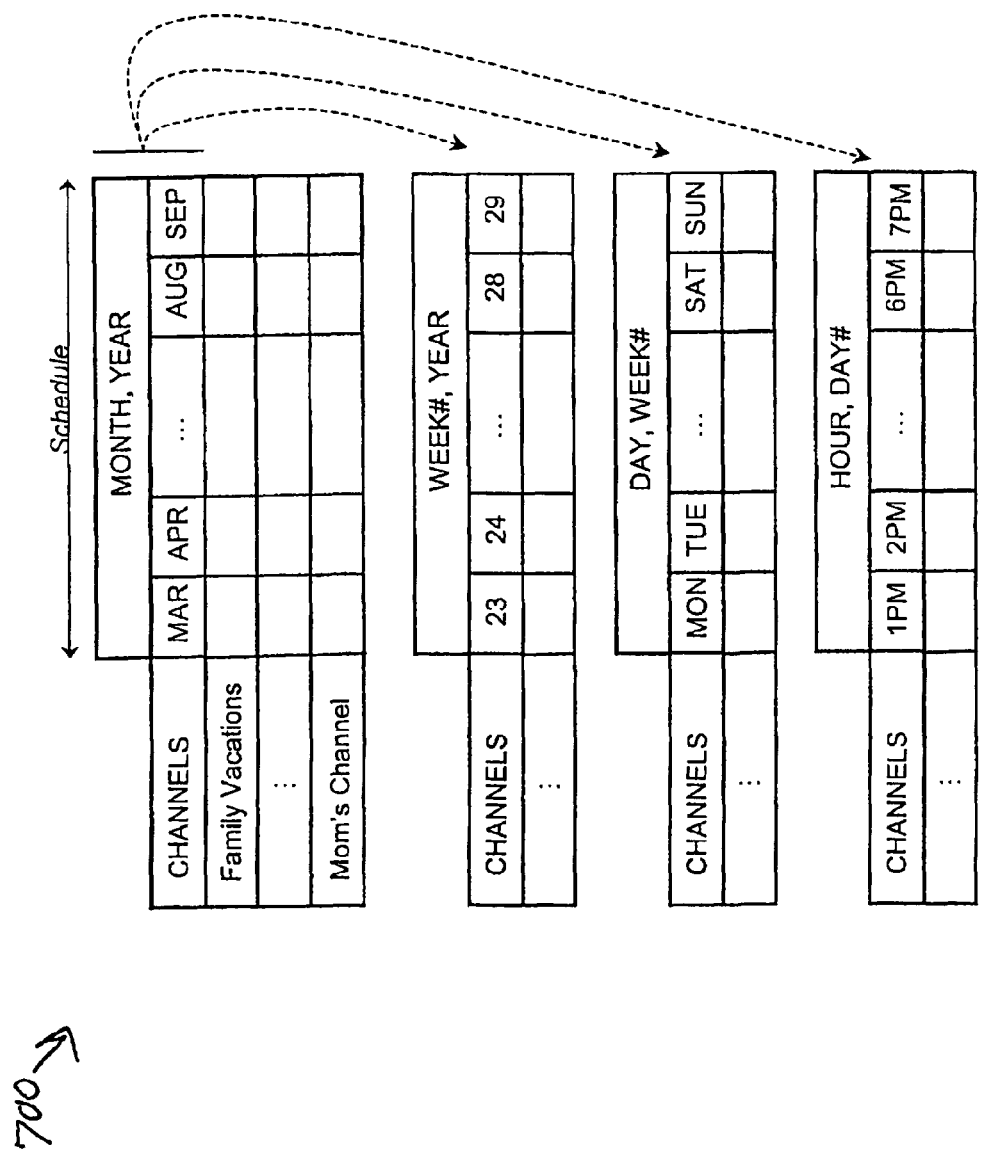
FIG. 7 is an exemplary illustration of several instantiations of a TV guide channel user interface of FIG. 4 in accordance with an embodiment of the present invention.

FIG. 7 illustrates possible multiple instantiations of a TV channel guide user interface 700 in accordance with an embodiment of the present invention. The TV channel guide user interface 700 may be viewed with a schedule having formats of, for example, "month, year", "week#, year", "day, week#", or "hour, day".

Referring to FIG. 8, a user of a media exchange network may push a media channel (e.g., "Vacation in Alaska Video") to a friend who is on the same media exchange network. The TV channel guide user interface 800 may give the friend several options 801 for how to accept and download the pushed media in accordance with an embodiment of the present invention.

For example, a first, most expensive option 803 may be "Express Delivery" which would deliver the pushed media to the friend in 18 minutes using queuing and cost $1.20, for example. The pushed media may be stored in a file in an MPEG 2 format that was recorded at a rate of 4 Mbps, for example. Queuing comprises buffering and delivering a previous part of the media and then buffering and delivering a next part of the media. For example, a first six minutes of the "Vacation in Alaska Video" may be buffered and delivered first, then a second six minutes may be buffered and delivered next, and so on until the entire media is delivered.

A second, less expensive option 802 may be "Normal Delivery" which would deliver the pushed media in 2 hours and 13 minutes without queuing and cost $0.59, for example. The pushed media may be stored in a file in an MPEG 2 format that was recorded at a rate of 1.5 Mbps, for example.

A third, least expensive option 804 may be "Overnight Delivery" which would deliver the pushed media by the next morning and cost only $0.05, for example. The pushed media may be stored in a file in an MPEG 2 format that was recorded at a rate of 19 Mbps and stored on a server, for example.

Figure 9A:
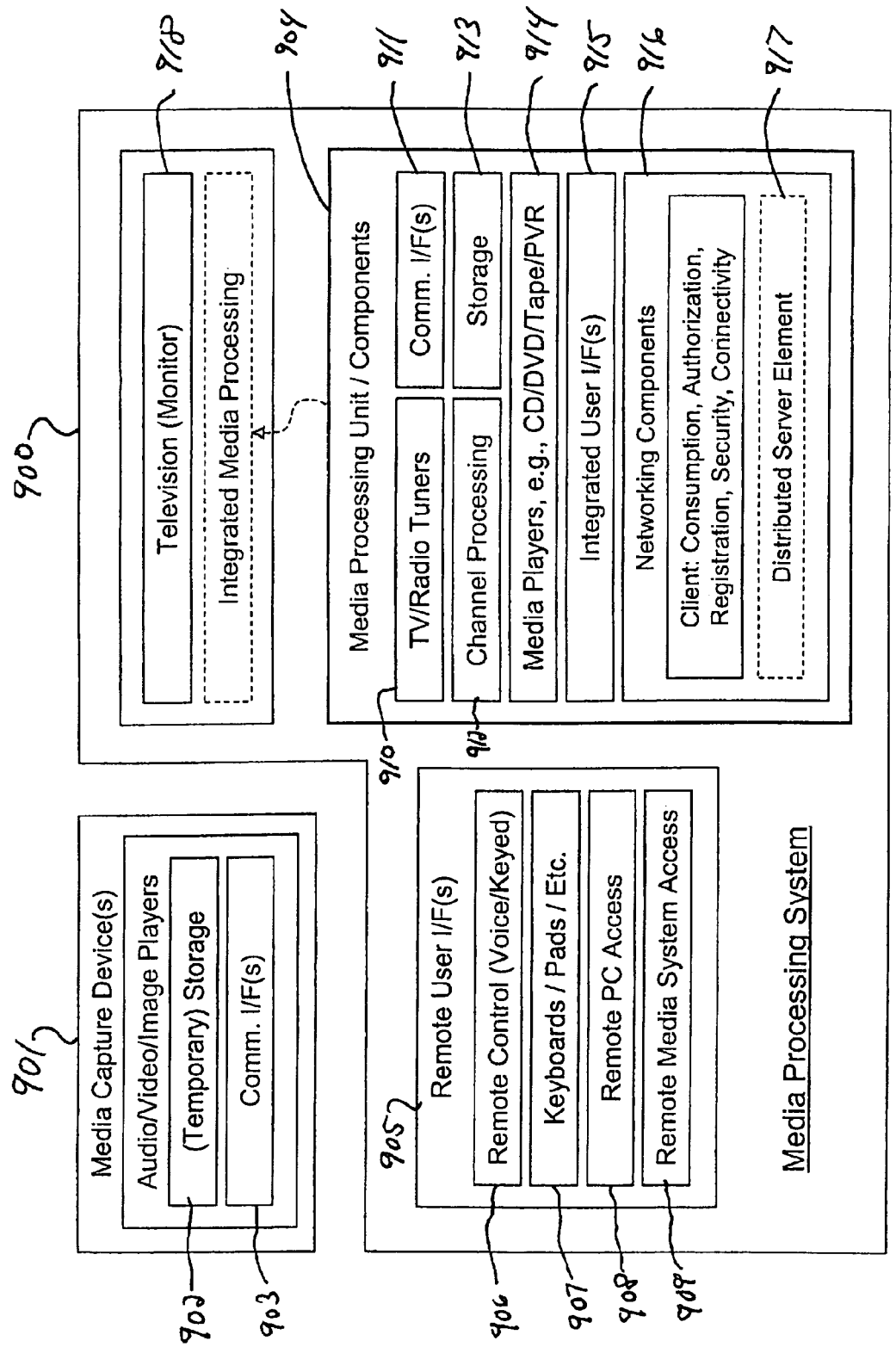
FIG. 9A is a schematic block diagram of a media processing system (MPS) interfacing to media capture peripherals in accordance with an embodiment of the present invention.

FIG. 9A illustrates the detailed elements of a media processing system (MPS) 900 and media capture devices 901 in accordance with an embodiment of the present invention. The media capture devices 901 may comprise audio, video, and image players, such as digital cameras, digital camcorders, and MP3 players, that each include a temporary storage area 902 and a communication interface 903 such as, for example, a USB interface or a wireless interface. The media capture devices 901 have the capability to interface to an MPS and a PC.

The MPS 900 comprises a media processing unit (MPU) 904, remote user interface(s) 905, and a TV screen 918 to provide integrated media processing capability and indirect user interface capability. The remote user interfaces 905 may comprise a voice or keyed remote control 906, keyboards and pads 907, a remote PC access interface 908, and a remote media system access interface 909 (i.e., providing access from another MPS).

The media processing unit (MPU) 904 comprises TV and radio tuners 910 for image and audio consumption, communications interfaces 911, channel processing 912 (creating, storing, indexing, viewing), storage 913, media players 914 (CD, DVD, Tape, PVR, MP3), an integrated user interface 915 (to provide a TV channel guide look-and-feel), networking components 916 to provide client functions such as consumption (billing), authorization (e.g., using digital certificates and digital ID's), registration, security, and connectivity. In an alternative embodiment of the present invention, the networking components 916 may include a distributed server element 917 that is part of a distributed server.

Figure 9B:
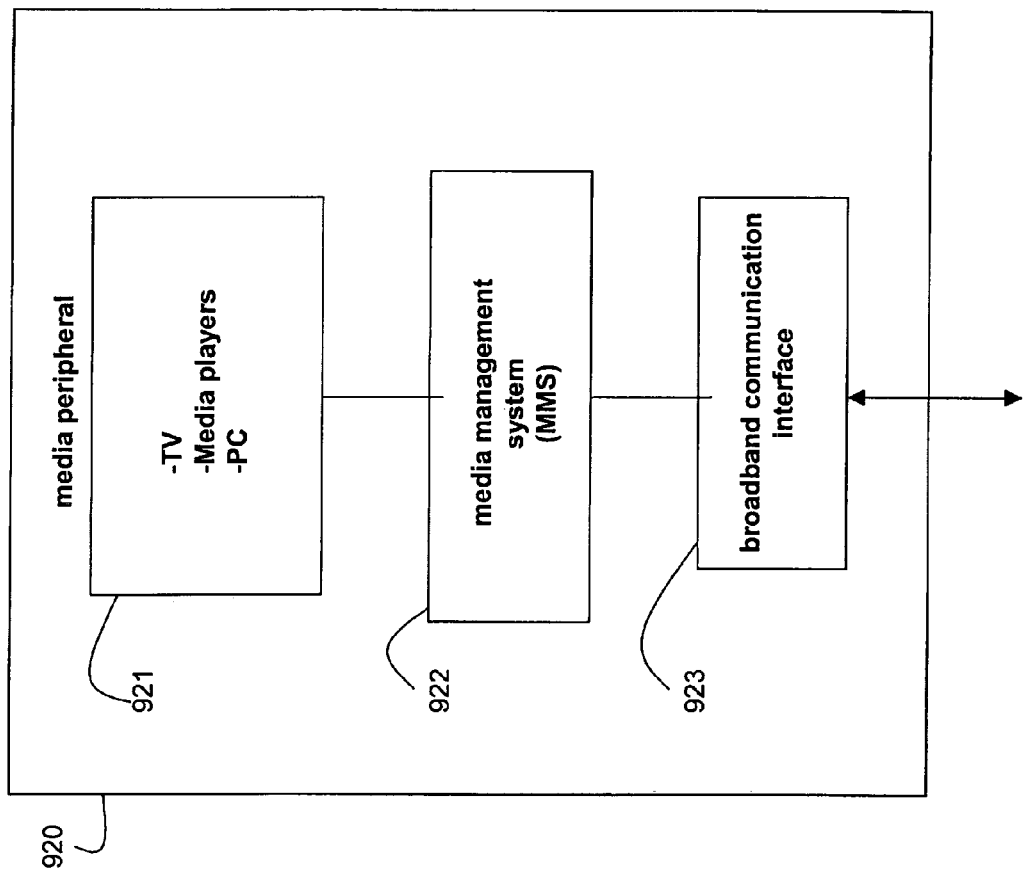
FIG. 9B illustrates an alternative embodiment of a media processing system (MPS) in accordance with various aspects of the present invention.

FIG. 9B illustrates an alternative embodiment of a media processing system (MPS) 920 in accordance with various aspects of the present invention. The MPS 920 is essentially an enhanced set-top-box for viewing and interacting with various user interfaces, media, data, and services that are available on the media exchange network using, for example, a remote control. The MPS 920 comprises a media peripheral 921, a MMS (media management system) 922, and a broadband communication interface 923.

The media peripheral 921 may include a TV (television), a PC (personal computer), and media players (e.g., a CD player, a DVD player, a tape player, and a MP3 player) for video, image, and audio consumption of broadcast and/or personal channels. The broadband communication interface 923 may include internal modems (e.g., a cable modem or DSL modem) or other interface devices in order to communicate with, for example, a cable or satellite head end.

The MMS 922 includes a software platform to provide functionality including media "push" capability, media "access" capability, media channel construction/selection, image sequence selection, text and voice overlay, channel and program naming, inter-home routing selection, author-ship and media rights management, shared inter-home media experience, billing service, and a media guide user interface providing an integrated TV channel guide look-and-feel.

Figure 10:
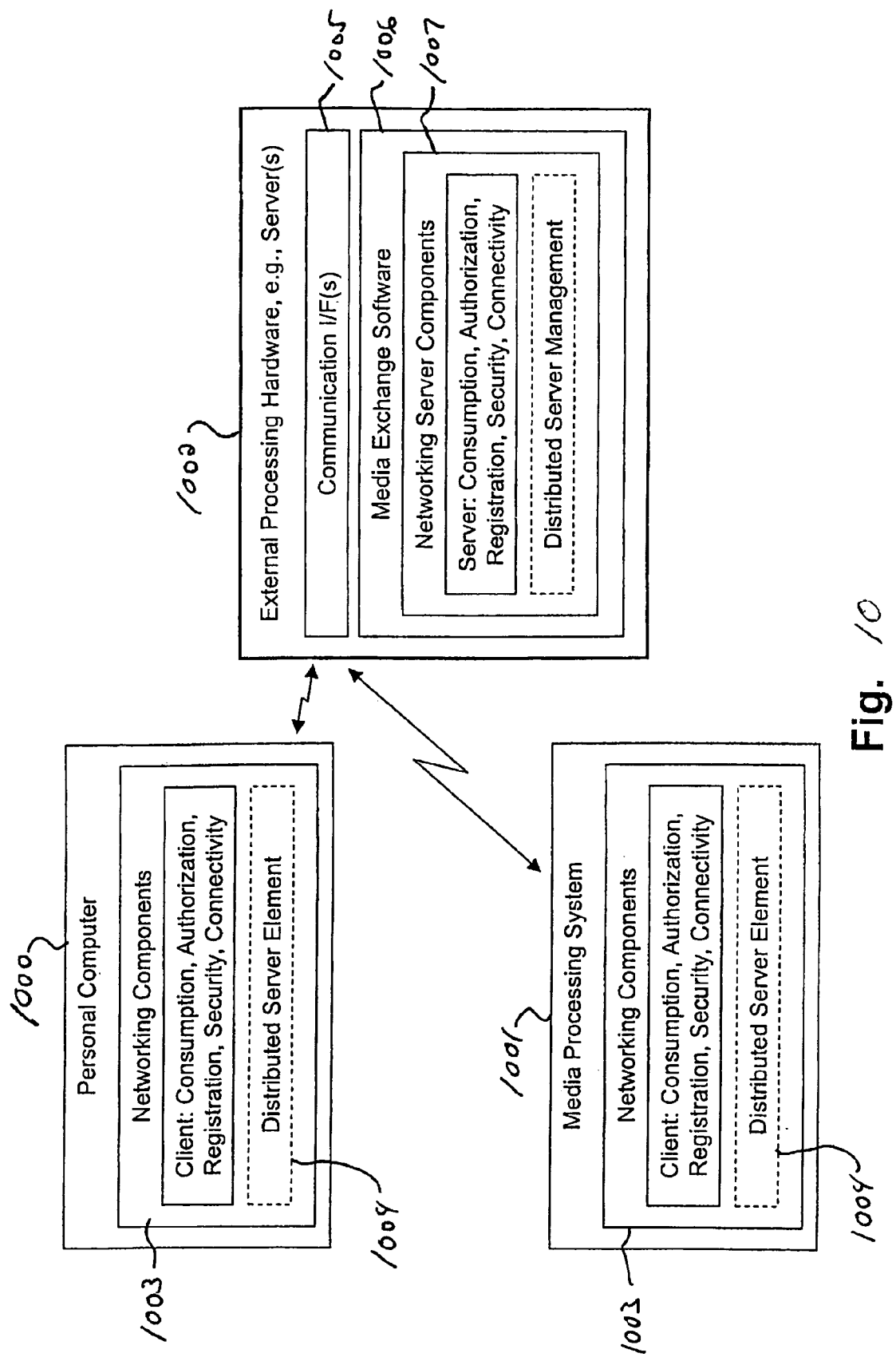
FIG. 10 is a schematic block diagram of a PC and an MPS interfacing to a server on a media exchange network in accordance with an embodiment of the present invention.

FIG. 10 illustrates connectivity between a PC 1000, an MPS 1001, and external processing hardware 1002 (e.g., a server) in accordance with an embodiment of the present invention. The PC 1000 and MPS 1001 include networking components 1003 to provide client functions such as consumption (billing), authorization, registration, security, and connectivity. Alternatively, the PC 1000 and MPS 1001 may include a distributed server element 1004 that is part of a distributed server.

The PC 1000 and MPS 1001 connect to the external processing hardware 1002 via wired or wireless connections. The external processing hardware 1002 comprises a distributed server or peer-to-peer server. The external processing hardware 1002 also comprises communication interfaces 1005 (e.g., cable interfaces, optical interfaces, etc.) and a media exchange software (MES) platform 1006. The MES platform 1006 in the external processing hardware 1002 allows for communication with the PC 1000 and MPS 1001 which may also use the same MES platform 1006. The external processing hardware 1002 also includes networking server components 1007 to provide the similar client functions such as consumption (billing), authorization, registration, security, and connectivity at the server side.

Figure 11:
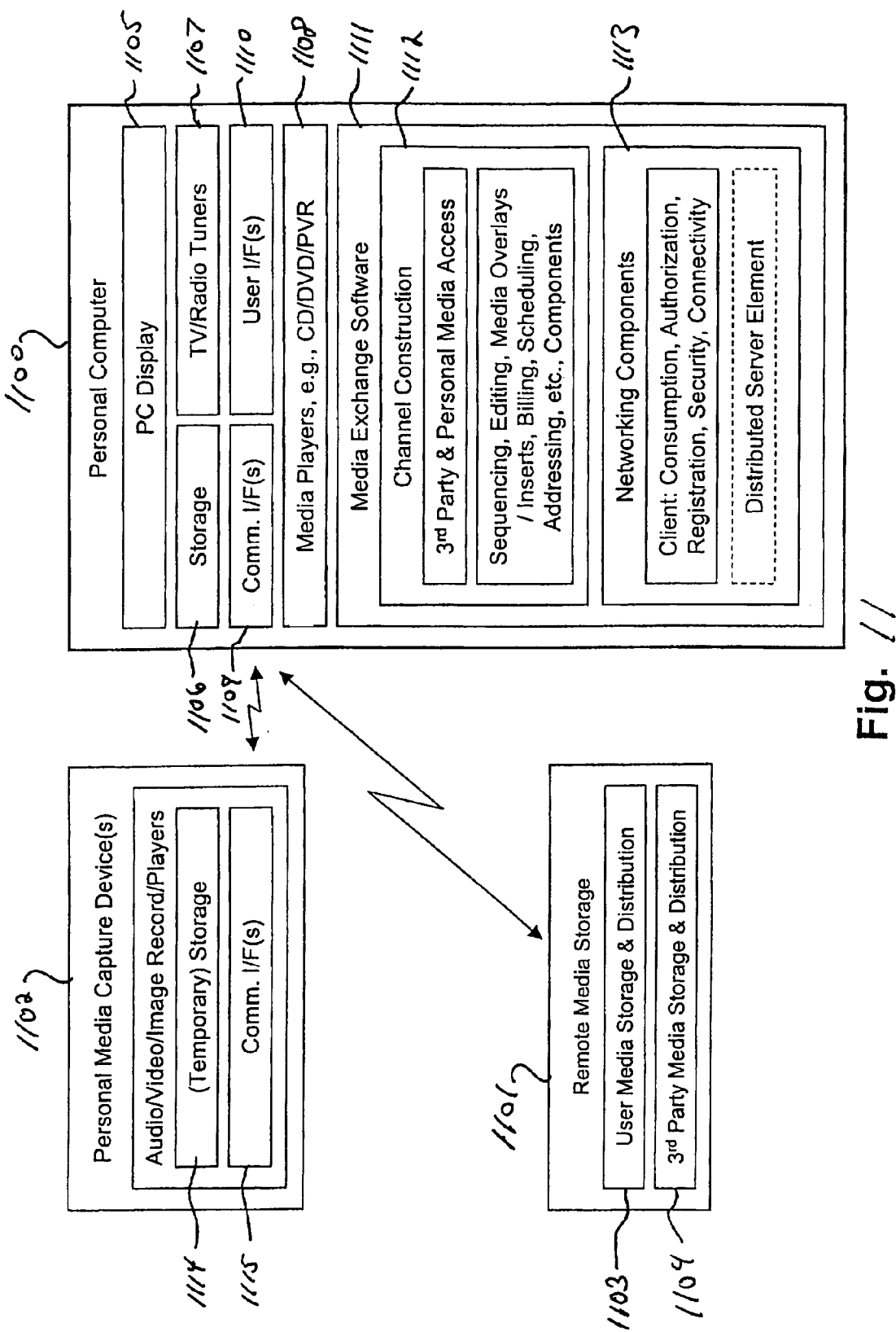
FIG. 11 is a schematic block diagram of a PC interfacing to personal media capture devices and remote media storage on a media exchange network in accordance with an embodiment of the present invention.

FIG. 11 illustrates connectivity between a PC 1100, remote media storage 1101, and personal media capture devices 1102 when the PC 1100 is used as the primary distributor of digital media such as in the case of PC-to-PC operation, in accordance with an embodiment of the present invention. The personal media capture devices 1102 and remote media storage 1101 connect to the PC 1100 via a wireless or wired connection. The remote media storage 1101 provides user media storage and distribution 1103 as well as third party media storage and distribution 1104. The personal media capture devices 1102 provide temporary storage 1114 and communication interfaces 1115.

Viewing is done using a PC monitor 1105 instead of a television screen. The PC 1100 may include storage 1106, TV/radio tuners 1107 for media consumption, media players 1108, and communication interfaces 1109 and user interfaces 1110 similar to those for the MPS of FIG. 9. The PC 1100 includes a media exchange software (MES) platform 1111 that provides channel construction capability 1112 and networking capability 1113. The channel construction capability 1112 allows third party and personal media access, sequencing, editing, media overlays and inserts, billing, scheduling, and addressing.

Various embodiments of the present invention include a system and method that provide several common user interfaces and associated functionality on PC's and MPS's (media processing systems) on a media exchange network.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A system supporting the communication and consumption of media using a common user interface, the system comprising:
   a television display in a first home;
   a first storage for storing media, in the first home, having a first associated network address, the first storage communicatively coupled to the television display;
   a first graphical user interface for display on the television display, the first graphical user interface having at least one view comprising graphical representations of one or more media channels supporting the communication and consumption of media, and having a first look and feel;
   a personal computer monitor in a second home;
   a second storage for storing media, in the second home, having a second associated network address, the second storage communicatively coupled to the personal computer monitor;
   a second graphical user interface for display on the personal computer monitor, the second graphical user interface having at least one view comprising graphical representations of the one or more media channels supporting the communication and consumption of media, and having a second look and feel;
   software resident in a first memory at the first home and a second memory at the second home, the software enabling a user at the first home to construct, at the first home, the one or more media channels from user selected and scheduled media content, the software also enabling closed and secure communication of the one or more media channels to members of a user group, in a peer to peer manner, from the first home to the second home;
   software that receives a request that identifies one of the first and second associated network addresses, and responds by identifying the other of the first and second associated network addresses to support the communication via the communication network of media between the first storage and the second storage for consumption; and
   the first graphical user interface and the second graphical user interface being substantially the same graphical user interface, the first look and feel and the second look and feel being substantially the same.

2. The system of claim 1 wherein the media comprises at least one of audio, a still image, video, and data.

3. The system of claim 1 wherein the media comprises real-time video.

4. The system of claim 1 wherein consumption comprises at least one of playing audio, displaying a still image, displaying video, and displaying data.

5. The system of claim 1 wherein the first and second associated network addresses are one of an Internet protocol (IP) address, a media access control (MAC) address, and an electronic serial number (ESN).

6. The system of claim 1 wherein the communication network comprises at least one of a cable infrastructure, a satellite network infrastructure, a digital subscriber line (DSL) infrastructure, an Internet infrastructure, an intranet infrastructure, a wired infrastructure, and a wireless infrastructure.

7. The system of claim 1 wherein the communication network is the Internet.

8. The system of claim 1 wherein at least a portion of the media available for consumption is user captured media.

9. The system of claim 1 wherein the first and second user interfaces comprise a view displaying information related to at least one media peripheral.

10. The system of claim 9 wherein the at least one media peripheral comprises at least one of a digital camera, a digital camcorder, an MP3 player, a home juke-box system, a multimedia personal digital assistant (PDA), and a mobile multimedia gateway device.

11. The system of claim 1 further comprising:
   at least one media peripheral communicatively coupled to one of the first storage and the second storage;
   a third graphical user interface for display on the at least one media peripheral, the third graphical user interface having at least one view comprising representations of one or more user created and scheduled media channels supporting the communication and consumption of media, and having a third look and feel; and
   the first, second, and third graphical user interface being substantially the same graphical user interface, the first look and feel, the second look and feel, and the third look and feel being substantially the same.

12. The system of claim 11 wherein the at least one media peripheral comprises at least one of a digital camera, a digital camcorder, an MP3 player, a home juke-box system, a multimedia personal digital assistant (PDA), a mobile multi-media gateway device, and a personal computer (PC).

13. A system supporting the communication and consumption of media using a common graphical user interface, the system comprising:
   a television display in a first home;
   set top box circuitry, in the first home, communicatively coupled to the television display;
   a first graphical user interface having at least one view comprising graphical representations of one or more media channels for display on the television display, and having a first look and feel;
   a personal computer in a second home;
   a second graphical user interface having at least one view comprising graphical representations of the one or more media channels for display on the personal computer, and having a second look and feel;
   software resident in memory of the set top box circuitry at the first home and in memory of the personal computer at the second home, the software enabling a user at the first home to construct, at the first home, the one or more media channels from user selected and scheduled media content, the software also enabling closed and secure communication of the one or more media channels to members of a user group, in a peer to peer manner, from the first home to the second home; and
   the first graphical user interface and the second graphical user interface being substantially the same user interface, and the first look and feel and the second look and feel being substantially the same.

14. The system of claim 13 wherein the media comprises at least one of audio, a still image, video, and data.

15. The system of claim 13 wherein the media comprises real-time video.

16. The system of claim 13 wherein consumption comprises at least one of playing audio, displaying a still image, displaying video, and displaying data.

17. The system of claim 13 wherein the communication network comprises at least one of a cable infrastructure, a satellite network infrastructure, a digital subscriber line (DSL) infrastructure, an Internet infrastructure, an intranet infrastructure, a wired infrastructure, and a wireless infrastructure.

18. The system of claim 13 wherein the communication network is the Internet.

19. The system of claim 13 wherein at least a portion of the media available for consumption is user captured media.

20. The system of claim 13 wherein the first and second graphical user interfaces comprise a view displaying information related to at least one media peripheral.

21. The system of claim 13 further comprising:
   at least one media peripheral communicatively coupled to one of the set top box circuitry and the personal computer;
   a third graphical user interface for display on the at least one media peripheral, the third graphical user interface having at least one view comprising graphical representations of the one or more media channels supporting the communication and consumption of media, and having a third look and feel; and
   the first, second, and third graphical user interfaces being substantially the same graphical user interface, and the first look and feel, the second look and feel, and the third look and feel being substantially the same.

22. The system of claim 21 wherein the at least one media peripheral comprises at least one of a digital camera, a digital camcorder, an MP3 player, a home juke-box system, a multi-media personal digital assistant (PDA), a mobile multi-media gateway device, and a personal computer (PC).

23. One or more circuits for use in a system supporting the communication and consumption of media using a common user interface, the one or more circuits comprising:
   at least one processor, in a first home, operably coupled to a display device and to a first storage for storing media in the first home, the first storage having a first associated network address, and communicatively coupled to a second storage for storing media, in a second home, the second storage having a second associated network address and being communicatively coupled to a second display device in the second home, the at least one processor operable to, at least:
   cause display on the first display device of a first graphical user interface having at least one view comprising graphical representations of one or more media channels supporting the communication and consumption of media and having a first look and feel;
   enable a user, at the first home, to construct the one or more media channels, at the first home, from user selected and scheduled media content;
   communicate with software that receives a request that identifies one of the first and second associated network addresses, and responds by identifying the other of the first and second associated network addresses to support the communication, via a communication network, of media between one of the first and second storage and the other of the first and second storage for consumption of media, in the second home, using a second graphical user interface displayed on the second display device and having a second look and feel, the second user interface having at least one view comprising graphical representations of the one or more media channels supporting the communication and consumption of media;
   enable closed and secure communication of the one or more media channels to members of a user group, in a peer to peer manner, from the first home to the second home; and
   the first graphical user interface and the second graphical user interface being substantially the same graphical user interface, and the first look and feel and the second look and feel being substantially the same.

24. The one or more circuits of claim 23, wherein the media comprises at least one of audio, a still image, video, and data.

25. The one or more circuits of claim 23 wherein the media comprises real-time video.

26. The one or more circuits of claim 23 wherein consumption comprises at least one of playing audio, displaying a still image, displaying video, and displaying data.

27. The one or more circuits of claim 23 wherein the first and second associated network addresses are one of an Internet protocol (IP) address, a media access control (MAC) address, and an electronic serial number (ESN).

28. The one or more circuits of claim 23 wherein the communication network comprises at least one of a cable infrastructure, a satellite network infrastructure, a digital subscriber line (DSL) infrastructure, an Internet infrastructure, an intranet infrastructure, a wired infrastructure, and a wireless infrastructure.

29. The one or more circuits of claim 23 wherein the communication network is the Internet.

30. The one or more circuits of claim 23 wherein at least a portion of the media available for consumption is user captured media.

31. The one or more circuits of claim 23 wherein the first and second graphical user interfaces comprise a view displaying information related to at least one media peripheral.

32. The one or more circuits of claim 31 wherein the at least one media peripheral comprises at least one of a digital camera, a digital camcorder, an MP3 player, a home juke-box system, a multi-media personal digital assistant (PDA), and a mobile multi-media gateway device.

33. The one or more circuits of claim 32 comprising:
at least one media peripheral communicatively coupled to one of the first storage and the second storage;
a third graphical user interface for display on the at least one media peripheral, the third graphical user interface having at least one view comprising graphical representations of the one or more media channels supporting the communication and consumption of media, and having a third look and feel; and
the first, second, and third graphical user interfaces being substantially the same graphical user interface, the first look and feel, the second look and feel, and the third look and feel being substantially the same.

34. The one or more circuits of claim 33 wherein the at least one media peripheral comprises at least one of a digital camera, a digital camcorder, an MP3 player, a home juke-box system, a multi-media personal digital assistant (PDA), a mobile multi-media gateway device, and a personal computer (PC).

35. The one or more circuits of claim 23 wherein the system comprises a set top box.

36. The one or more circuits of claim 23 wherein one or both of the first display device and the second display device comprises a television.

37. The one or more circuits of claim 23 wherein one or both of the first display device and the second display device comprise a computer monitor.

* * * * *